United States Patent [19]

Mittelhäuser

[11] Patent Number: 4,822,140

[45] Date of Patent: Apr. 18, 1989

[54] REAR-VIEW MIRROR FOR MOTOR VEHICLES

[76] Inventor: Bernhard Mittelhäuser, Am Krähenberg, D-3002 Wedemark 2, Fed. Rep. of Germany

[21] Appl. No.: 113,786

[22] Filed: Oct. 27, 1987

[30] Foreign Application Priority Data

Oct. 27, 1986 [DE] Fed. Rep. of Germany ....... 3636495

[51] Int. Cl.$^4$ .............................................. G02B 17/00
[52] U.S. Cl. .................................... 350/279; 350/280
[58] Field of Search ............... 350/278, 279, 280, 281, 350/634, 636

[56] References Cited

U.S. PATENT DOCUMENTS

| | | | |
|---|---|---|---|
| 2,420,259 | 5/1947 | McNamara | 350/280 |
| 3,748,025 | 7/1973 | Van Putten, Jr. | 350/280 |
| 4,088,396 | 5/1978 | Edelstein | 350/634 |
| 4,319,806 | 3/1982 | Brandenburg | 350/281 |

FOREIGN PATENT DOCUMENTS 52-59431 5/1977 Japan ................................... 350/279

Primary Examiner—John K. Corbin
Assistant Examiner—Loha Ben
Attorney, Agent, or Firm—Becker & Becker, Inc.

[57] ABSTRACT

A rear-view mirror for a motor vehicle. The mirror housing, which is provided with the mirror body, is pivotable about an upper transverse axis into two positions (normal position and anti-glare position). In order to reduce the sensitivity of the mirror to vibrations, the housing has a supporting surface associated therewith, at least for the two above-mentioned positions. The supporting surface is curved in conformity with the pivot radius determined by the transverse axis. The housing and the holder, which is used for mounting the housing, preferably have curved surfaces which correspond to one another and via which these component parts may be mutually supported.

7 Claims, 1 Drawing Sheet

U.S. Patent
Apr. 18, 1989
4,822,140
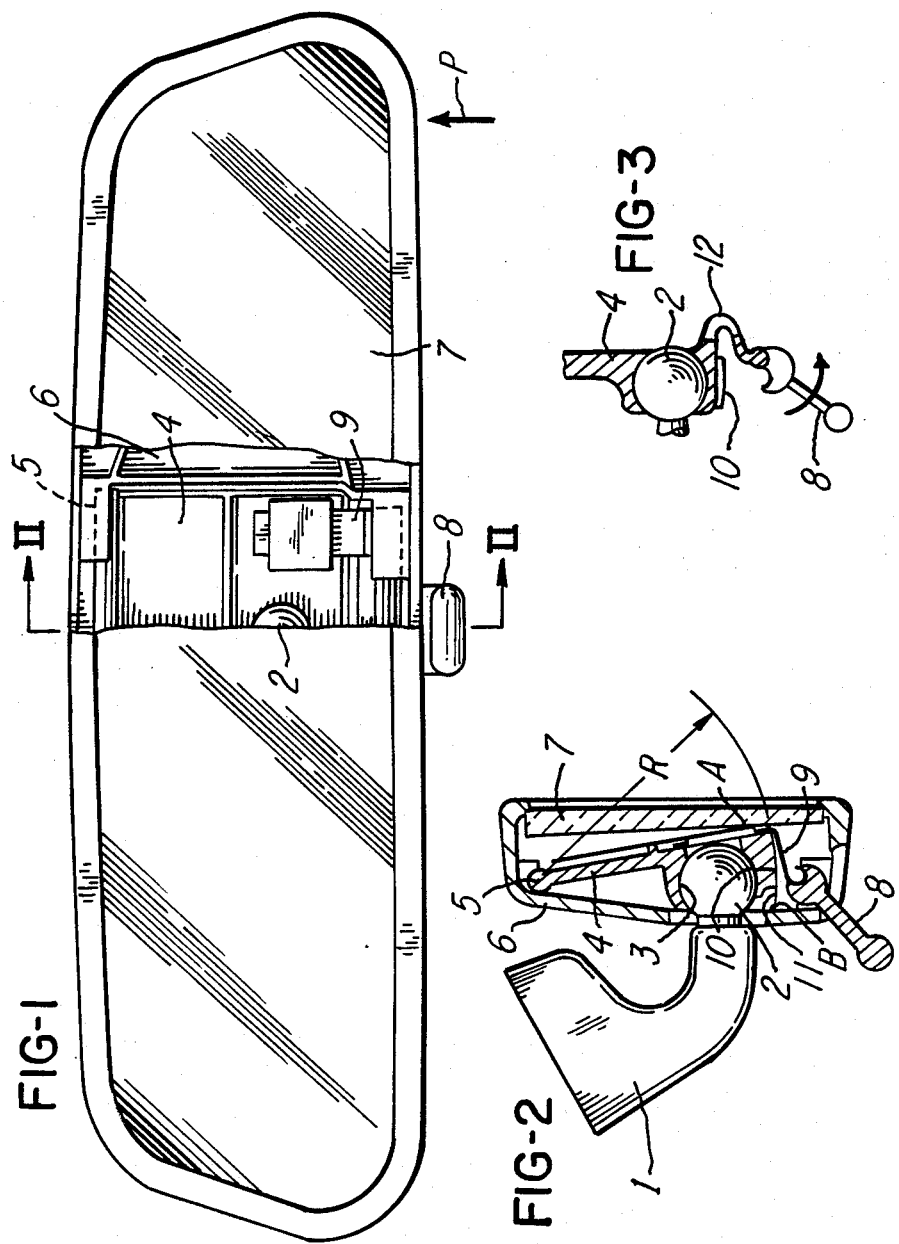

REAR-VIEW MIRROR FOR MOTOR VEHICLES

BACKGROUND OF THE INVENTION

The present invention relates to a rear-view mirror, especially an internal mirror, that includes a holder, which is adjustably disposed on a ball-and-socket joint, and a dish-shaped housing that is provided with a mirror body, mounted in the aperture of the housing, and that is displaceable about a horizontal axis, by means of a pivot lever, into two positions (normal position, antiglare position) in the region of the upper edge of the holder.

The two positions of the housing, and of the mirror body connected thereto, are achieved by a changeover of springs. As a general rule, the holder and the housing are mutually supported in the two end positions. However, this support serves only to limit the pivotal movement of the housing relative to the holder.

Since in the case of the aforementioned type of mirrors, the mirror body is narrow and wide, that is to say it protrudes considerably beyond each end of the holder, there is a danger of vibrations occurring as a result of sudden jolts with such vibrations rendering the mirror unusable, or at least inaccurate. In addition, the housing is generally held by its ends in order to adjust the mirror via the intermediary of the ball-and-socket joint, thereby necessitating the introduction of considerable forces into the holder via the housing, especially when the ball-and-socket joint is tightly set.

It is an object of the present invention to improve the aforementioned type of mirrors in such a way that the rigidity of the connection between the holder and the housing is increased, and the resistance of the mirror to vibrations is improved. A further object of the present invention is to provide a sturdy, durable connection between the holder and the housing.

BRIEF DESCRIPTION OF THE DRAWING

These and other objects and advantages of the present invention will appear more clearly from the following specification in conjunction with the accompanying schematic drawing, in which:

FIG. 1 is a view of one exemplary embodiment of an inventive internal mirror for road vehicles, with part of the mirror body removed;

FIG. 2 is a cross-sectional view taken along the line II—II of FIG. 1; and

FIG. 3 is a view, similar to that of FIG. 2, showing a modified version of an inventive internal mirror.

SUMMARY OF THE INVENTION

The rear-view mirror of the present invention is characterized primarily in that the housing has a supporting surface associated therewith in the region of its lower edge, at least for the two end positions; the supporting surface is curved in conformity with the pivot radius determined by the horizontal pivot axis. In such a case, however, it is preferable for the supporting surface to extend over the entire pivot path of the housing. It is also advantageous for both the housing and the holder to be provided with curved supporting surfaces that correspond to one another.

Accordingly, the connection between the holder and the housing is in the form of pivotal connection at the upper edge of the housing, whereas the above-mentioned supporting surfaces are provided in a curved configuration on the lower edge of the housing. As a result, the above-mentioned connection is suitably strengthened, so that it is also possible to tolerate relatively large tilting movements safely when the ball-and-socket joint is adjusted via the housing.

Pursuant to one preferred inventive embodiment, the supporting surfaces are disposed on both sides of the ball-and-socket joint (viewed in the direction of the mirror body).

Pins may be provided on the holder; these pins, which define the horizontal axis, are disposed almost vertically, but at least substantially vertically, above the supporting surfaces.

A mirror of this type presupposes minimal manufacturing tolerances, and it is therefore advantageous to use molded plastic bodies, which can be produced very accurately, for the individual component parts of the mirror. As an extension of this concept, the holder may also be provided with extensions or attachments that are molded or formed thereon, with such attachments assuming the role of a changeover or turnover spring. Nevertheless, however, steel springs, such as leaf springs, helical springs, and U-springs, are also possible according to the present invention.

Further specific features of the present invention will be described in detail subsequently.

DESCRIPTION OF PREFERRED EMBODIMENTS

Referring now to the drawing in detail, the mirror is mounted in the interior of the vehicle by means of a curved base 1 that is provided, at its free end, with a ball 2 which, with a socket 3 in a holder 4, forms a ball-and-socket joint. Pins 5, which are effective at each end, are situated at the upper end of the holder 4. The pins 5 extend horizontally or almost horizontally, and are used for pivotably mounting a housing 6 about the axis defined by the pins 5. A wedge-shaped mirror body 7 is securely installed in the aperture of the essentially dish-shaped housing 6.

A pivot lever 8 is mounted on the lower edge of the housing 6 and permits the latter, together with the mirror body 7, to be pivoted to a limited extent about the upper pins 5 via the intermediary of leaf springs 9, so that, on the one hand, a normal position and, on the other hand, an anti-glare position of the mirror body 7 can be achieved and set. The pivotal movement of the pivot lever 8 is in the form of a pivot path of approximately 90°. As a result, the leaf springs 9 are deformed in such a way that in one position the housing 6 abuts against the holder 4 at A, as shown in FIG. 2, while in the other position the housing 6 abuts against the holder 4 at B. Abutment at the above-mentioned locations is ensured by a changeover of the leaf springs 9.

It is important for the connection between the housing 6 and the holder 4 to be effected and ensured at the top by mean of the pin joints; however, a curved surface 10 is provided on the lower edge of the holder 4, with the curvature of the surface 10 being determined by the upper pivot axis (pins 5). Compare, in this respect, the radius R. An abutment surface 11 of the housing 6 has the same form, i.e. is identically curved, and corresponds to this surface 10, so that the housing can be given suitable support with respect to the holder 4, for example when adjusting the mirror in the direction of the arrow P. In addition, the sensitivity to vibrations is substantially reduced by the abutment of these two surfaces 10 and 11.

In the embodiment shown in FIG. 3, there in no need for any leaf springs 9. The latter are replaced by strips 12 that are molded or formed on the holder 4, i.e. they merge integrally with the holder 4, and consequently they are also formed from the tough, resilient, yet sufficiently flexible material which is also used for the holder 4. This molding-on is possible because, solely due to the narrow tolerances of the surface 10, the holder 4 has to be produced from an accurate mold, e.g. an injection die-cast mold.

It is also possible to dispose or provide the surfaces 10 and 11 and/or the changeover springs for adjusting the housing 6 in such a manner that the springs also expressly contribute towards increasing the abutment against the surfaces 10 and 11, i.e. that the springs at this location increase the pressure between the holder 4 and the housing 6.

The present invention is, of course, in no way restricted to the specific disclosure of the specification and drawing, but also encompasses any modifications within the scope of the appended claims.

What I claim is:

1. In a rear-view mirror for motor vehicles, especially an internal mirror, including a holder that is adjustably disposed on a ball-and-socket joint, and a dish-shaped housing that is provided with a mirror body, mounted in an aperture of said housing, and that is pivotably mounted to said holder about a horizontal axis in the region of the upper edge of said holder, with said housing being pivotable, by means of a pivot lever, into two end positions, namely a normal position and an antiglare position, the improvement wherein:

additional support surface means are associated with said housing and said holder at least for supplementing said two end positions thereof to provide rigid abutment in radial direction, with said support surface means being located and curved in conformity with a pivot radius determined by said horizontal axis, said additional surface means assuring a secure adjustment so that undesired vibrations of the mirror are avoided during vehicle operation and assuring that radial forces applied to the rear-view mirror from end to end thereof are taken up safely via the rigid abutment in radial direction when manual adjustment of the rear-view mirror occurs other than at the location where the rear-view mirror is pivotably mounted.

2. A rear-view mirror according to claim 1, in which said support surface means extend over the entire pivot path of said housing.

3. A rear-view mirror according to claim 1, in which said support surface means comprise cooperating and correspondingly curved surfaces on both said housing and said holder.

4. A rear-view mirror according to claim 1, in which, when viewed in a direction toward said mirror body, said support surface means are disposed on both sides of said ball-and-socket joint.

5. A rear-view mirror according to claim 4, in which said holder is provided with pins that define said horizontal axis, with said pins being disposed at least essentially vertically above said support surface means.

6. A rear-view mirror according to claim 1, in which said holder has integrally formed thereon at least one strip-like element that cooperates with said pivot lever and serves as a changeover spring.

7. A rear-view mirror according to claim 1, which includes a changeover spring that operatively connects said holder and said pivot lever, with said support surface means and said changeover spring being embodied and disposed in such a way that said spring serves to bring or press said holder and said housing together in the region of said support surface means.

* * * * *